(12) United States Patent
Rai et al.

(10) Patent No.: US 7,998,351 B2
(45) Date of Patent: Aug. 16, 2011

(54) TANNIN BASED POLYMERIC COAGULANTS COMPOSITION AND METHOD OF USE

(76) Inventors: Vinod Kumar Rai, Bangalore (IN); Ashok Shyadligeri, Bangalore (IN); Baraka Kawawa, Bensalem, PA (US); Abdul Rafi Khwaja, East Norriton, PA (US); Narain Madhavan, Bangalore (IN)

( * ) Notice: Subject to any disclaimer, the term of this patent is extended or adjusted under 35 U.S.C. 154(b) by 483 days.

(21) Appl. No.: 11/615,400

(22) Filed: Dec. 22, 2006

(65) Prior Publication Data

US 2008/0149569 A1     Jun. 26, 2008

(51) Int. Cl.
    *C02F 1/56* (2006.01)
(52) U.S. Cl. ........ 210/708; 210/725; 210/728; 210/730; 252/180; 524/735; 526/238.2; 527/400
(58) Field of Classification Search .................... 210/708
    See application file for complete search history.

(56) References Cited

U.S. PATENT DOCUMENTS

| | | | |
|---|---|---|---|
| 4,558,080 A | 12/1985 | Quamme et al. | |
| 4,734,216 A | 3/1988 | Kelly et al. | |
| 4,781,839 A * | 11/1988 | Kelly et al. | 210/725 |
| 5,100,561 A | 3/1992 | Wood et al. | |
| 5,169,540 A | 12/1992 | Fillipo et al. | |
| 5,256,304 A * | 10/1993 | Meyer et al. | 210/708 |
| 5,433,863 A | 7/1995 | Braden et al. | |
| 5,643,462 A | 7/1997 | Chen et al. | |
| 5,659,002 A * | 8/1997 | Reed et al. | 528/129 |
| 5,719,224 A * | 2/1998 | Agree et al. | 524/437 |
| 5,720,887 A | 2/1998 | Vasconcellos et al. | |
| 5,846,436 A * | 12/1998 | Chen et al. | 210/730 |
| 5,851,433 A | 12/1998 | Hart et al. | |
| 5,916,991 A | 6/1999 | Chen et al. | |
| 6,020,422 A | 2/2000 | Connors et al. | |
| 6,478,986 B1 | 11/2002 | Lamb et al. | |

FOREIGN PATENT DOCUMENTS

EP     0630858 A     12/1994

* cited by examiner

*Primary Examiner* — Peter A Hruskoci
(74) *Attorney, Agent, or Firm* — GE Global Patent Operation; Barbara A. Toop; Catherine J. Winter

(57) ABSTRACT

Composition and method of use for tannin based environmentally benign polymeric coagulants are disclosed. Tannin based coagulants are copolymers of naturally occurring tannins and a cationic monomer. One embodiment of the present invention provides for a composition, of a tannin based polymeric coagulant which is comprised of N,N-(dimethylaminoethyl) methacrylate (MADAME) polymerized using t-butylhydroperoxide and sodium metabisulfite. The resulting polyMADAME is converted to hydrochloride and then blended/reacted in an aqueous medium with tannin to obtain a homogenous poly(MADAME)-tannin composition. The method of use comprises adding an amount of the composition effective for the purpose of clarifying oily wastewater from food and beverage, steel, automotive, transportation, refinery, pharmaceutical, metals, paper and pulp, chemical processing and hydrocarbon processing industries.

31 Claims, No Drawings

TANNIN BASED POLYMERIC COAGULANTS COMPOSITION AND METHOD OF USE

FIELD OF THE INVENTION

The present invention relates to a process of clarifying wastewater, and in particular the oily wastewater from the production of pharmaceuticals, food and beverage, steel, paper and pulp, metals, transportation, chemical processing and hydrocarbon processing. More particularly, this invention relates to the novel coagulants and process for the production of tannin based polymeric coagulants and their use for the treatment of oily wastewater.

BACKGROUND OF THE INVENTION

Water clarification is well-known throughout a number of industries. Various physical means have been used to remove particulate matter dispersed in a bulk liquid phase. Examples of common particulate separation techniques include filtration, settling, desalting, electrochemical techniques, centrifugation, flotation and the like. Such separation processes can often be made more efficient by the use of coagulating and flocculating agents. Wastewater containing emulsified oil can be difficult to treat by physical processes alone. In such circumstances, demulsifying coagulants and flocculants can be used to break the emulsion and hasten agglomeration of the oil particles formed. Inorganic coagulants alone or in combination with organic polyelectrolytes have been used in demulsification. However, these treatments are not completely satisfactory because they increase solids content, which can cause sludge disposal problems.

Tannins are astringent water-soluble extracts from the bark, pods, leaves, and fruit of various plants and trees. Established industrial practices of extracting tannins from the wood of the quebracho tree and the bark of the wattle tree have made condensed tannins available in substantial quantities. Condensed tannins are polyphenolic and polymerize in combination with other chemicals such as formaldehyde.

U.S. Pat. No. 4,558,080 discloses the production of stable tannin-based flocculants made by polymerizing tannin with an aldehyde such as formaldehyde and an amino compound, such as monoethanolamine, while monitoring the viscosity of the reacting mixture.

U.S. Pat. No. 4,734,216, discloses a flocculating compound comprised of polymerized tannin described in the above referenced patent in combination with an inorganic flocculant such as aluminum sulfate or iron chloride.

U.S. Pat. No. 5,643,462 discloses a composition comprised of a water soluble/dispersible tannin containing polymer obtained by polymerizing ethylenically unsaturated monomers with tannin, the method of preparing the same and their use for water clarification.

U.S. Pat. No. 6,478,986 teaches a process for the production of a quaternary tannate as a coagulating/flocculating agent, and its use for treating drinking water and water used in industry. The coagulating/flocculating agent is a vegetable polyelectrolytic cation.

There still remains a need for a simple preparation of tannin based environmentally friendly polymeric coagulants, which are useful in water clarification processes.

SUMMARY OF THE INVENTION

Tannin based environmentally benign polymeric coagulant compositions are disclosed which constitute polymers of ionic/nonionic unsaturated monomers and naturally occurring tannins. One embodiment of the present invention provides water-soluble compositions of a tannin-based polymeric coagulant which is comprised of N,N-(dimethylaminoethyl)methacrylate(MADAME) polymerized using t-butylhydroperoxide and sodium metabisulfite. The resulting polyMADAME is converted to hydrochloride and then blended/reacted in an aqueous medium with tannin to obtain a homogenous poly(MADAME)-Tannin composition.

Another embodiment of the invention is for composition of a tannin based polymeric coagulant comprised of N,N (dimethylaminoethyl)methacrylate(MADAME) which is converted to a hydrochloride by reacting with Hydrochloric acid and then polymerized using t-butylhydroperoxide and sodium metabisulfite. The resulting polyMADAME hydrochloride is then blended/reacted in an aqueous medium with tannin to obtain a homogeneous poly(MADAME)-Tannin composition.

An alternate embodiment of the invention is comprised of monomer [2-(methacryloyloxy)ethyl]trimethylammonium chloride (METAC) polymerized using t-butylhydroperoxide and sodium metabisulfite. The resulting polyMETAC is then blended/reacted in an aqueous medium with tannin to obtain a homogenous poly(METAC)-Tannin composition.

The method of use comprises adjusting the pH from about 2 to about 10 and adding an amount of the composition effective either alone or in conjunction with other coagulants/flocculants for the purpose of clarifying oily wastewater from food and beverage, steel, automotive, transportation, refinery, pharmaceutical, metals, paper and pulp, chemical processing and hydrocarbon processing industries.

The various embodiments provide tannin based environmentally friendly polymeric coagulants, which are easy to produce and which are excellent for use for clarification of oil containing wastewater, including those oil containing wastewaters generated during food and beverage processing.

DETAILED DESCRIPTION OF THE INVENTION

The singular forms "a," "an" and "the" include plural referents unless the context clearly dictates otherwise. The endpoints of all ranges reciting the same characteristic are independently combinable and inclusive of the recited endpoint. All references are incorporated herein by reference.

The modifier "about" used in connection with a quantity is inclusive of the stated value and has the meaning dictated by the context (e.g., includes the degree of error associated with measurement of the particular quantity).

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

Presently is disclosed a "one pot" preparation of environmentally friendly polymeric coagulants that are tannin based, more specifically, naturally occurring tannins, which are reacted with a cationic polymer and their use for the clarification of oil containing wastewater.

The tannin component can be obtained from various wood and vegetation materials found throughout the world. Tannins are a large group of water-soluble complex organic compounds. Almost every tree or shrub that grows contains some tannins in the leaves, twigs, barks, wood or fruit. Examples of barks are wattle, mangrove, oak, eucalyptus, hemlock, pine, larch and willow. Examples of woods are the quebracho chestnut, oak and urunday. Examples of fruits are myrobalans, valonia, divi-divi, tara and algarrobilla. Examples of leaves are sumac and gambier and examples of roots are canaigre and palmetto. Among the preferred materials is wattle. These natural tannins can be categorized into the traditional "hydrolysable" tannins are "condensed" tannins. Condensed tannin extracts are those manufactured from the bark of the black wattle tree, from the wood of the quebracho tree, from the bark of the hemlock tree and from the bark of several commonly used pine species. The preparation of the wattle and quebracho extracts is a well established industrial practice and they are freely available in considerable amounts.

Condensed tannin extracts, such as wattle and quebracho, are composed of approximately 70% polyphenolic tannins, 20% to 25% non-tannins, mainly simple sugars and polymeric carbohydrates (hydrocolloid gums) the latter of which constitute 3% to 6% of the extract and heavily contribute to extract viscosity, while the balance is accounted for by a low percentage of moisture. A preferred embodiment of the present invention calls for use of condensed tannin extracts.

One embodiment of the present invention comprises the preparation of a tannin based polymeric composition starting with N,N-(dimethylaminoethyl)methacrylate (MADAME). MADAME is polymerized using t-butylhydroperoxide (t-BHP) and sodium metabisulfite as a redox initiator pair. The t-BHP is present in an amount of from about 0.36 to about 8.41 mole % with respect to MADAME, and sodium metabisulfite is present in an amount of from about 0.18 to about 4.4 mole %. The polymerization can occur at temperatures of from about 10° C. to about 80° C., preferably from about 45° C. to about 50° C., and the time required is from about 10 minutes to about 60 minutes. The resulting polyMADAME is of a medium to high molecular weight and the molecular weight of the polyMADAME can be controlled by varying initiator concentration and reaction conditions, such as time and temperature. The molecular weight of the polyMADAME can be from about 500 to about 2,000,000, and is preferably in the range of about 5000 to about 200,000.

The resulting polyMADAME is then converted to the corresponding hydrochloride by adding concentrated Hydrochloric acid. Thereafter, polyMADAME hydrochloride is blended/reacted with tannin over a period of from about 30 minutes to abut 60 minutes at a temperature of from about 65° C. to about 70° C. The resulting product is a homogeneous, viscous, brown solution of polyMADAME-hydrochloride-Tannin composition, and as set forth below. The mole ratio of tannin to MADAME is about 1:0.5 to about 1:5.0, with optimum activity and a preferred mole ratio of 1:1.5 to about 1:3.

Another embodiment of the present invention comprises an alternative process of preparation of a tannin based polymeric composition with N,N-(dimethylaminoethyl)methacrylate (MADAME) Hydrochloride salt. In this preparation, prior to polymerization, a basic MADAME monomer is converted to a low pH cationic monomer by reacting it with hydrochloric acid solution. The resulting MADAME HCL is then polymerized by reaction of redox initiator pair consist of t-butylhydroperoxide (t-BHP) as the oxidant and sodium metabisulfite as the reductant. As stated above, the polymerization can occur at temperatures of from about 10° C. to about 80° C., preferably from about 45° C. to about 50° C., and the time required is from about 10 minutes to about 60 minutes. The resulting polyMADAME is of a medium to high molecular weight and the molecular weight of the polyMADAME can be controlled by varying initiator concentration and reaction conditions, such as time and temperature. The molecular weight of the polyMADAME can be from about 500 to about 2,000,000, and is preferably in the range of about 5000 to about 200,000.

The resulting polyMADAME is thereafter blended/reacted with tannin over a period of from about 10 minutes to about 60 minutes at a temperature of from about 35° C. to about 80° C. The resulting product is a homogeneous, viscous, brown solution of polyMADAME-hydrochloride-Tannin composition, and as set forth below. The mole ratio of tannin to MADAME is about 1:0.5 to about 1:5.0, with optimum activity and a preferred mole ratio of 1:1.5 to about 1:3.

An alternate embodiment for the present invention comprises the preparation of a tannin based polymeric composition starting with [2-(methacryloyloxy)ethyl]trimethylammonium chloride (METAC). METAC is polymerized using a t-butylhydroperoxide and sodium metabisulfite redox initiator pair. t-BHP and sodium metabisulfite are used in a range of from about 0.18 to about 8.4 mole % with respect to METAC. The polymerization can occur at temperatures of from about 10° C. to about 80° C., preferably from 45° C. to 50° C., and the time required is from about 10 minutes to about 60 minutes. The resulting polyMETAC is of a medium to high molecular weight and the molecular weight of the polyMETAC can be controlled by varying, initiator concentration and reaction conditions, such as time and temperature. The molecular weight of the polyMETAC can be from about 500 to about 2,000,000, and is preferably in the range of about 5000 to about 200,000. By varying the molecular weight of the polyMETAC, the viscosity of the coagulant composition can be controlled.

The resulting polyMETAC is blended/reacted with tannin. The resulting product is a homogeneous, viscous, brown solution of polyMETAC-Tannin, and as set forth below. The mole ratio of tannin to METAC is about 1:0.5 to about 1:5.0, with optimum activity and a preferred mole ratio of 1:1.5 to about 1:3.

The resulting coagulants can be used for clarification of various wastewaters, for instance they can be used to treat wastewater in the food and beverage industries, oil refineries, transportation, chemical processing, paper and pulp, metals processing and steel industry. Actual dosage range for the polymeric coagulants depends upon the characteristics of the wastewater to be treated. These characteristics include, for example, the amount of oil, the type of oil in the wastewater, the concentration of solids, the presence and concentration of other contaminants in the water, the amount of soluble metal ions present, and the pH of the water. Preferably, about 1 parts per million to about 1000 parts per million of the polymeric coagulant to parts of the wastewater is employed. However, activity can be seen over broader doses of the coagulant, and certainly the composition of the actual wastewater to be treated will have a direct impact on the optimum dosage range the coagulant composition can be used by adjusting pH from about 2 to about 10, and in conjunction with cationic and anionic flocculants, wherein the cationic flocculants are selected from the group consisting of AETAC/Acrylamide copolymers, METAC/Acrylamide copolymers or DADMAC/Acrylamide copolymers in the molecular weight range from 1,000,000 to 14,000,000 and the anionic flocculants are selected from the group consisting of Acrylamide polymers or Acrylic acid/Acrylamide copolymers with a molecular weight range of 1,000,000 to 23,000,000.

EXPERIMENTAL PROCEDURE FOR PREPARATION OF TANNIN CONTAINING POLYMERS

EXAMPLE 1

Preparation of PolyMADAME-Tannin Coagulant Composition

To a 1000 ml round bottom flask equipped with an overhead mixer, water condenser, thermocouple, nitrogen inlet tube and a septum was added 400 gms of deionized water and 192.5 gms of MADME under nitrogen environment. The solution was heated to 45-50° C. with mixing. At 48-50° C. a redox initiator pair of 2.25 gms of t-BHP in 7.68 gms of water and 1.78 gms in 8.48 gms of water were charged simultaneously into the reactor through a syringe pump over a period of about 30 to about 40 minutes. 125.5 gms of HCl, at about 35% concentration, was charged slowly into the reactor from a dropping funnel over a period of about 10 to about 15 minutes. The batch was stirred at this temperature for about 30 minutes, and formed a clear solution. At this point, the nitrogen blanket was discontinued. Over the next 5 to about 10 minutes, 174.5 gms of 70% ME Wattle Tannin was added to the reactor, and the nitrogen blanket was then resumed. 120 gms of DI water was charged, and the batch was equilibrated to about 65° C. to about 75° C. and mixed until homogeneous. The homogenous mixture was then held at this temperature for about one hour. After the hold, a sample was taken and tested for solids. If necessary, additional DI water is added to adjust the solids concentration from about 35 to about 40%. Thereafter, the composition is mixed for about 15 minutes and an additional sample is taken and tested for solids. The composition was cooled to room temperature. The result was 1,026 gms of polyMADAME-Tannin coagulant at a level of 37.06% solids.

EXAMPLE 2

Preparation of PolyMADAME-Tannin Composition

To a 500 ml of four-neck, round bottom flask equipped with an overhead mixer, water condenser, thermocouple and nitrogen inlet tube was added 39.05 gms of MADAME monomer and 93.71 gms of deionized water were charged. The solution was cooled to around 18-20° C. under nitrogen blanket. Into this solution 27.22 gms of 33% HCL was added sub-surfacely over a period of 30 minutes using a syringe pump. Nitrogen blanket was switched to sparge after all HCL had been added and the resulting low pH solution was mixed for 30 minutes. Polymerization was carried out by addition of initiator pair consisting of 2.24 gms of 21.5% sodium metabisulfite solution and 1.80 gms of 23.4% tertiary-butylhydroperoxide for 30 minutes. After polymerization the viscous solution was allowed to react from about 20 to about 30 minutes. Then additional initiator pair consisting of 2.34 gms of 12.5% t-BHP was added at once. This was followed by addition of 1.32 gms of 23.6% Sodium metabisulfite solution for 10 minutes. The polymer solution was allowed to react for 20 minutes. Then 41.37 gms of 70% ME Wattle Tannin was added followed by 76 gms of Deionized water. Temperature was raised to 70° C. and contents were allowed to react for one hour. After one hour, the reaction was cooled to room temperature. The solids were measured to be 31.8%.

EXAMPLE 3

Preparation of PolyMETAC-Tannin Coagulant Composition

A polyMETAC-tannin coagulant was prepared by flushing a reactor with nitrogen and charging 95 gms of deionized water ("DI") initially to the reactor. The agitator was started and a nitrogen blanket was initiated around the reactor. The reactor was charged with 69.25 gms of [2-(methacryloyloxy)ethyl]trimethylammonium chloride (METAC), and the composition was equilibrated to 50° C. 0.44 gms of sodium metabisulfite in 2.12 gms of water and 0.55 gms of t-BHP in 1.92 gms of water were charged simultaneously into the reactor through a syringe pump over a period of about 30 to about 40 minutes. Stirring was continued until the reaction mass became a homogenous clear solution, which took about 30 minutes. At this point, the nitrogen blanket was discontinued. Over the next 5 to about 10 minutes, 43.65 gms of 70% ME Wattle Tannin was added to the reactor, and the nitrogen blanket was then resumed. The batch was equilibrated from about 65° C. to about 75° C. and mixed until it was homogeneous. The homogenous mixture was held at this temperature for about 1 hr and then cooled to room temperature. During the cool down, 40.0 gms of DI Water, was added to the composition. A sample was taken and tested for solid percentage at 160° C. If necessary, additional DI water is added to adjust the solids concentration. Thereafter, the composition is mixed for about 15 minutes and an additional sample was taken and tested for solids. The result was 252.89 gms of polyMETAC-Tannin coagulant composition at a level of 34.44% solids.

EFFICACY TESTS

In order to demonstrate the efficacy of the tannin containing polymers of the invention for reducing turbidity/Chemical Oxygen Demand (COD)/Biochemical Oxygen Demand ($BOD_5$), water clarification tests were conducted using synthetic oily wastewater and wastewater samples from refinery, dairy and meat processing (poultry and beef) plants. These serve as examples, but are not intended to limit the applicability to other similar wastewaters.

TEST PROCEDURE

The procedure used was a standard jar test designed to simulate the operation of a typical wastewater treatment clarifier or Dissolved Air Flotation Unit (DAF) or Entrapped Air Flotation Unit (EAF). For single component treatments the test procedure consisted of, adding the polymer treatment to the test substrate at various doses, mixing the treated substrate and allowing the solids formed in the water to settle. The residual turbidity/COD/$BOD_5$ of the supernatant water produced was measured after treatment.

For triple component treatments the test procedure consisted of; adjusting the pH from about 2 to about 10, adding the tannin containing polymer to the test substrate, followed by cationic flocculant and then anionic flocculant. The substrate was subjected to mixing throughout the chemical addition. Solids were allowed to settle after mixing and the supernatant was analyzed for residual turbidity/COD/$BOD_5$. This is an example of the triple component treatment system and does not limit the invention to this procedure.

Treatment of Poultry and Beef wastewater with pH adjustment from about 2 to about 10 and addition of cationic flocculant and anionic flocculant was not effective in reducing the turbidity of the wastewater. Table 1 contains the data for the results of the efficacy tests without the use of tannin polymer.

TABLE 1

Efficacy Testing Without Tannin Polymer on Beef and Poultry Wastewater

| Wastewater | Raw Water Turbidity (NTU) | Tannin Polymer (ppm) | Cationic Floc* (ppm) | Anionic Floc** (ppm) | Turbidity (NTU) |
| --- | --- | --- | --- | --- | --- |
| Poultry | 502 | 0 | 3.75 | 15 | 388 |
| Beef | 3720 | 0 | 6.25 | 12.5 | 2519 |

*Cationic Flocculant = 10/90 AETAC/Acrylamide copolymer AETAC is methyl chloride quaternary sal of dimethylaminoethyl acrylate
**Anionic Flocculant = 39/61 Acrylic acid/Acrylamide copolymer

EXAMPLE 4

A synthetic oily water mixture was prepared consisting of 75% vegetable fat, 11.98% POE4 Lauryl alcohol and 13.2% oleic acid. The mixture was mixed on a hot plate for 15 minutes and then was blended in a blender for an additional 10 minutes. Then 10 gms of this oily mixture was taken in a blender and blended for 7 minutes with 390 gms of distilled water. The resulting emulsion was diluted to 1:9 using tap water. The final synthetic oily water contained 0.20% fat and oil.

Table 2 contains efficacy test results of PolyMADAME-Tannin compositions on synthetic oily wastewater. The results are for Sample 142 from Example 1 with MADAME:Tannin mole ratio of 1.5:1 and Sample 136 from Example 1 with MADAME:Tannin mole ratio of 3:1.

TABLE 2

Efficacy Testing of PolyMADAME-Tannin Polymer on Synthetic Wastewater
Synthetic Oily Wastewater Turbidity (3700-3800 NTU)

| Sample 142* (ppm) | Turbidity (NTU) | Sample 136** (ppm) | Turbidity (NTU) |
| --- | --- | --- | --- |
| 97 | 197 | 78 | 47.5 |
| 121 | 160 | 104 | 19 |
| 146 | 98.1 | 130 | 27.3 |
| 170 | 48.8 | 156 | 29.4 |
| 194 | 34.2 | 208 | 32.8 |

*Sample 142 is polyMADAME-Tannin polymer from Example 1 at MADAME:Tannin mole ratio of 1.5:1
**Sample 136 is polyMADAME-Tannin polymer from Example 1 at MADAME:Tannin mole ratio of 3:1

Table 3 contains efficacy test results of PolyMETAC-Tannin composition on synthetic oily wastewater. Results are for a sample from Example 3. The METAC:Tannin mole ratio for the composition was 2.5:1.

TABLE 3

Efficacy Testing of PolyMETAC-Tannin Polymer on Synthetic Wastewater
Synthetic Oily Wastewater Turbidity (3700-3800 NTU)

| PolyMETAC-Tannin* (ppm) | Turbidity (NTU) |
| --- | --- |
| 12 | 4519 |
| 34 | 3509 |
| 57 | 46.6 |
| 80 | 29.8 |
| 92 | 28.6 |
| 115 | 27.8 |
| 126 | 29.5 |
| 161 | 58.5 |
| 206 | 2700 |
| 252 | 5395 |

*polyMETAC-Tannin polymer from Example 3 at METAC:Tannin mole ratio of 2.5:1

There is clearly an optimum range of application for use, above which the coagulant composition does not work as well.

EXAMPLE 5

Table 4 contains efficacy test results of PolyMADAME-Tannin composition from Example 1 at a MADAME:Tannin mole ratio of 3:1 on poultry wastewater without the addition of cationic and anionic flocculants.

TABLE 4

Efficacy Testing of PolyMADAME-Tannin Polymer on Poultry Wastewater Without Addition of Flocculants
Poultry Wastewater Turbidity (1068 FAU)

| Sample 136* Dose (ppm) | Turbidity (FAU) |
| --- | --- |
| 0 | 1068 |
| 9 | 164 |
| 36 | 145 |
| 108 | 36 |
| 145 | 16 |
| 163 | 21 |
| 181 | 23 |
| 199 | 18 |
| 217 | 16 |
| 289 | 246 |
| 434 | 183 |

*Sample 136 is polyMADAME-Tannin polymer from Example 1 at MADAME:Tannin mole ratio of 3:1

Table 5 contains efficacy test results of PolyMADAME-Tannin composition from Example 1 at a MADAME:Tannin mole ratio of 3:1 on poultry wastewater in conjunction with cationic and anionic flocculants.

TABLE 5

Efficacy Testing of PolyMADAME-Tannin Polymer on Poultry Wastewater in Conjunction with Flocculants
Poultry Wastewater Turbidity (644-669 NTU)

| Sample 1512-5*** (ppm) | Cationic Floc* (ppm) | Anionic Floc** (ppm) | Turbidity (NTU) |
| --- | --- | --- | --- |
| 17 | 20 | 15 | 12.2 |
| 21 | 13 | 8 | 11.8 |
| 25 | 13 | 8 | 8.5 |

TABLE 5-continued

Efficacy Testing of PolyMADAME-Tannin Polymer
on Poultry Wastewater in Conjunction with Flocculants
Poultry Wastewater Turbidity (644-669 NTU)

| Sample 1512-5*** (ppm) | Cationic Floc* (ppm) | Anionic Floc** (ppm) | Turbidity (NTU) |
|---|---|---|---|
| 29 | 13 | 5 | 6.2 |
| 34 | 13 | 5 | 6.3 |

*Cationic Flocculant = 10/90 AETAC/Acrylamide copolymer AETAC is methyl chloride quaternary salt of dimethylaminoethyl acrylate
**Anionic Flocculant = 39/61 Acrylic acid/Acrylamide copolymer
***1512-5 is PolyMADAME-Tannin composition from Example 1 at MADAME:Tannin mole ratio of 3:1

Table 6 contains efficacy test results of PolyMADAME-Tannin composition from Example 2 at a MADAME:Tannin mole ratio of 2.5:1 on poultry wastewater in conjunction with cationic and anionic flocculants. The table shows reductions in Turbidity, COD and $BOD_5$ by the use of tannin polymer.

TABLE 6

Efficacy Testing of PolyMADAME-Tannin Polymer on Poultry Wastewater in Conjunction with Flocculants
Poultry Wastewater Turbidity (502 NTU), COD (2960 ppm), $BOD_5$ (2570 ppm)

| 2803-125*** Dose (ppm) | Cationic Floc* (ppm) | Anionic Floc** (ppm) | Turbidity (NTU) | COD (ppm) | $BOD_5$ (ppm) |
|---|---|---|---|---|---|
| 160 | 4 | 40 | 268 | 2005 | N/A |
| 80 | 4 | 23 | 32 | 944 | 582 |
| 32 | 4 | 25 | 21 | 950 | N/A |
| 24 | 4 | 28 | 27 | 878 | N/A |
| 19 | 4 | 25 | 30 | 838 | 848 |
| 16 | 4 | 23 | 66 | 1054 | N/A |
| 10 | 4 | 27 | 78 | 1141 | 898 |

*Cationic Flocculant = 10/90 AETAC/Acrylamide copolymer AETAC is methyl chloride quaternary sal of dimethylaminoethyl acrylate
**Anionic Flocculant = 39/61 Acrylic acid/Acrylamide copolymer
***2803-125 is PolyMADAME-Tannin composition from Example 2 at a MADAME:Tannin mole ratio of 2.5:1
N/A = Data not available Table 7 contains efficacy test results of PolyMETAC-tannin composition from Example 3 at a METAC:Tannin mole ratio of 2.5:1 on Poultry wastewater.

TABLE 7

Efficacy Testing of PolyMETAC-Tannin Polymer
on Poultry Wastewater in Conjunction with Flocculants
Poultry Wastewater Turbidity (216-550 NTU)

| Sample 144*** (ppm) | Cationic Floc* (ppm) | Anionic Floc** (ppm) | Turbidity (NTU) |
|---|---|---|---|
| 10 | 13 | 8 | 10.3 |
| 14 | 15 | 5 | 6.1 |
| 17 | 13 | 8 | 5.2 |
| 21 | 25 | 3 | 9.4 |

*Cationic Flocculant = 10/90 AETAC/Acrylamide copolymer AETAC is methyl chloride quaternary sal of dimethylaminoethyl acrylate
**Anionic Flocculant = 39/61 Acrylic acid/Acrylamide copolymer
***144 is PolyMETAC-Tannin composition from Example 3 at a METAC:Tannin mole ratio of 2.5:1

EXAMPLE 6

Table 8 contains efficacy test results of PolyMADAME-tannin composition from Example 1 at MADAME:Tannin mole ratio of 3:1 on Beef wastewater.

TABLE 8

Efficacy Testing of PolyMADAME-Tannin Polymer on
Beef Wastewater in Conjunction with Flocculants
Beef Wastewater Turbidity (3312-3460 NTU)

| Sample 1512-5*** (ppm) | Cationic Floc* (ppm) | Anionic Floc** (ppm) | Turbidity (NTU) |
|---|---|---|---|
| 21 | 30 | 15 | 24 |
| 25 | 30 | 15 | 18 |
| 29 | 30 | 13 | 14.7 |
| 34 | 30 | 13 | 13.7 |
| 38 | 30 | 16 | 14 |
| 46 | 30 | 16 | 14 |
| 50 | 30 | 18 | 13 |

*Cationic Flocculant = 10/90 AETAC/Acrylamide copolymer AETAC is methyl chloride quaternary salt of dimethylaminoethyl acrylate
**Anionic Flocculant = 39/61 Acrylic acid/Acrylamide copolymer
***1512-5 is PolyMADAME-Tannin composition from Example 1 at a MADAME:Tannin mole ratio of 3:1

Table 9 contains efficacy test results of PolyMETAC-tannin composition from Example 3 at a METAC:Tannin mole ratio of 2.5:1 on Beef wastewater.

TABLE 9

Efficacy Testing of PolyMETAC-Tannin Polymer on Beef
Wastewater in Conjunction with Flocculants
Beef Wastewater Turbidity (3391-3493 NTU)

| Sample 144*** (ppm) | Cationic Floc* (ppm) | Anionic Floc** (ppm) | Turbidity (NTU) |
|---|---|---|---|
| 28 | 30 | 18 | 12.7 |
| 31 | 25 | 15 | 11.7 |
| 34 | 25 | 15 | 10.5 |
| 38 | 28 | 15 | 10.3 |
| 41 | 25 | 15 | 12.6 |

*Cationic Flocculant = 10/90 AETAC/Acrylamide copolymer AETAC is methyl chloride quaternary sal of dimethylaminoethyl acrylate
**Anionic Flocculant = 39/61 Acrylic acid/Acrylamide copolymer
***144 is PolyMETAC-Tannin composition from Example 3 at a METAC:Tannin mole ratio of 2.5:1

EXAMPLE 7

Table 10 contains efficacy test results of PolyMADAME-Tannin compositions. Results are for Sample 142 from Example 1 with MADAME:Tannin mole ratio of 1.5:1 and Sample 136 from Example 1 with MADAME:Tannin mole ratio of 3:1 on refinery wastewater.

TABLE 10

Efficacy Testing of PolyMADAME-Tannin Polymers
on Refinery Wastewater
Refinery Wastewater Turbidity (155 NTU)

| Sample 136** (ppm) | Turbidity (NTU) | Sample 142* (ppm) | Turbidity (NTU) |
|---|---|---|---|
| 10 | 83.1 | 10 | 103 |
| 17 | 41.3 | 17 | 59.9 |
| 33 | 62.2 | 33 | 43.5 |

*Sample 142 is polyMADAME-Tannin polymer from Example 1 at MADAME:Tannin mole ratio of 1.5:1
**Sample 136 is polyMADAME-Tannin polymer from Example 1 at MADAME:Tannin mole ratio of 3:1

EXAMPLE 8

Table 11 contains efficacy test results of PolyMADAME-Tannin compositions. Results are for Sample 142 from Example 1 with MADAME:Tannin mole ratio of 1.5:1 and Sample 136 from Example 1 with MADAME:Tannin mole ratio of 3:1 on dairy wastewater.

TABLE 11

Efficacy Testing of PolyMADAME-Tannin Polymers on Dairy Wastewater
Dairy Wastewater Turbidity (708 NTU)

| Sample 142* (ppm) | Turbidity (NTU) | Sample 136** (ppm) | Turbidity (NTU) |
|---|---|---|---|
| 146 | 30.9 | 143 | 19.2 |
| 182 | 25.3 | 182 | 11.6 |
| 206 | 23.8 | 208 | 6.1 |

*Sample 142 is polyMADAME-Tannin polymer from Example 1 at MADAME:Tannin mole ratio of 1.5:1
**Sample 136 is polyMADAME-Tannin polymer from Example 1 at MADAME:Tannin mole ratio of 3:1

While typical embodiments have been set forth for the purpose of illustration, the foregoing descriptions should not be deemed to be a limitation on the scope herein. It is apparent that numerous other forms and modifications of this invention will occur to one skilled in the art without departing from the spirit and scope herein. The appended claims and these embodiments should be construed to cover all such obvious forms and modifications that are within the true spirit and scope of the present invention.

Having described the invention, that which is claimed is:

1. A method for forming a tannin based polymeric coagulant composition comprising the steps of
    a) polymerizing N,N-(dimethylaminoethyl) methacrylate to a molecular weight of about 500 to about 2,000,000; and
    b) reacting the polymerized N,N-(dimethylaminoethyl) methacrylate from a) in an aqueous medium with tannin to form a homogeneous poly(N,N-(dimethylaminoethyl) methacrylate)-tannin coagulant composition.

2. The method of claim 1, wherein the polymerization further comprises t-butylhydroperoxide and sodium metabisulfite as a redox initiator pair.

3. The method of claim 1 wherein the polymerization is carried out at a temperature of about 10° C. to 80° C.

4. The method according to claim 1, wherein the reacting step b) comprises reacting a mole ratio of tannin to the polymerized N,N-(dimethylaminoethyl) methacrylate of about 1:05 to about 1:5 for a period of about 10 to 60 minutes at a temperature of about 35° C. to about 80° C. to produce a homogeneous, viscous brown solution of the polymeric coagulant composition.

5. A method for forming a tannin based polymeric coagulant composition comprising the steps of
    a) converting N,N-(dimethylaminoethyl) methacrylate monomer to a low pH cationic N,N-(dimethylaminoethyl) methacrylate hydrochloride monomer by reacting with hydrochloric acid solution;
    b) polymerizing the N,N-(dimethylaminoethyl) methacrylate hydrochloride to a molecular weight of about 500 to about 2,000,000; and
    c) reacting the polymerized N,N-(dimethylaminoethyl) methacrylate hydrochloride from b) in an aqueous medium with tannin to form a homogeneous poly(N,N-(dimethylaminoethyl) methacrylate hydrochloride)-tannin coagulant composition.

6. The method of claim 5, wherein the polymerization further comprises t-butylhydroperoxide and sodium metabisulfite as a redox initiator pair.

7. The method of claim 5 wherein the polymerization is carried out at a temperature of about 10° C. to 80° C.

8. The method according to claim 5, wherein the reacting step c) comprises reacting a mole ratio of tannin to the polymerized N,N-(dimethylaminoethyl) methacrylate hydrochloride of about 1:05 to about 1:5 for a period of about 10 to 60 minutes at a temperature of about 35° C. to about 80° C. to produce a homogeneous, viscous brown solution of the polymeric coagulant composition.

9. A method for forming a tannin based polymeric coagulant composition comprising the steps of
    a) polymerizing [2-(methacryloyloxy)ethyl]trimethylammonium chloride to a molecular weight of about 500 to about 2,000,000; and
    b) reacting the polymerized [2-(methacryloyloxy)ethyl]trimethylammonium chloride from a) in an aqueous medium with tannin to form a homogeneous poly([2-(methacryloyloxy)ethyl]trimethylammonium chloride)-tannin coagulant composition.

10. The method of claim 1, 5 or 9, wherein the polymerization may be carried out by redox, thermal, ionic, or photoinitiation.

11. The method according to claim 9, wherein the reacting step b) comprises reacting a mole ratio of tannin to the polymerized [2-(methacryloyloxy)ethyl]trimethylammonium chloride of about 1:05 to about 1:5 for a period of about 10 to 60 minutes at a temperature of about 35° C. to about 80° C. to produce a homogeneous, viscous brown solution of the polymeric coagulant composition.

12. A method for treating oily wastewater comprising adding to said wastewater an amount effective to clarify the wastewate, of a coagulant composition produced by a process comprising the steps of
    a) polymerizing N,N-(dimethylaminoethyl) methacrylate to a molecular weight of about 500 to about 2,000,000; and
    b) reacting the polymerized N,N-(dimethylaminoethyl) methacrylate from a) in an aqueous medium with tannin to form a homogeneous poly(N,N-(dimethylaminoethyl) methacrylate)-tannin coagulant composition.

13. The method of claim 12 wherein the coagulant composition is used in conjunction with cationic and anionic flocculants, wherein the cationic flocculants are selected from the group consisting of AETAC/Acrylamide copolymers, METAC/Acrylamide copolymers or DADMAC/Acrylamide copolymers in the molecular weight range from 1,000,000 to 14,000,000 and the anionic flocculants are selected from the group consisting of Acrylamide polymers or Acrylic acid/Acrylamide copolymers with a molecular weight range of 1,000,000 to 23,000,000.

14. The method of claim 12 wherein the coagulant composition is used by adjusting the pH from about 2 to about 10.

15. The method of claim 12 wherein the coagulant composition is used by adjusting pH from about 2 to about 10 and in conjunction with cationic and anionic flocculants, wherein the cationic flocculants are selected from the group consisting of AETAC/Acrylamide copolymers, METAC/Acrylamide copolymers or DADMAC/Acrylamide copolymers in the molecular weight range from 1,000,000 to 14,000,000 and the anionic flocculants are selected from the group consisting of Acrylamide polymers or Acrylic acid/Acrylamide copolymers with a molecular weight range of 1,000,000 to 23,000,000.

16. The method of claim 12 wherein the coagulant composition is added to the wastewater in an amount from about 1 parts to 1000 parts per million of wastewater.

17. The method according to claim 12, wherein the reacting step b) comprises reacting a mole ratio of tannin to the polymerized N,N-(dimethylaminoethyl) methacrylate of about 1:05 to about 1:5 for a period of about 10 to 60 minutes at a temperature of about 35° C. to about 80° C. to produce a homogeneous, viscous brown solution of the polymeric coagulant composition.

18. A method for treating oily wastewater comprising adding to said wastewater an amount effective to clarify the wastewate, of a coagulant composition produced by a process comprising the steps of
a) polymerizing [2-(methacryloyloxy)ethyl] trimethylammonium chloride to a molecular weight of about 500 to about 2,000,000; and
b) reacting the polymerized [2-(methacryloyloxy)ethyl] trimethylammonium chloride from a) in an aqueous medium with tannin to form a homogeneous poly([2-(methacryloyloxy)ethyl]trimethylammonium chloride)-tannin coagulant composition.

19. The method of claim 18 wherein the coagulant composition is used in conjunction with cationic and anionic flocculants, wherein the cationic flocculants are selected from the group consisting of AETAC/Acrylamide copolymers, METAC/Acrylamide copolymers or DADMAC/Acrylamide copolymers in the molecular weight range from 1,000,000 to 14,000,000 and the anionic flocculants are selected from the group consisting of Acrylamide polymers or Acrylic acid/Acrylamide copolymers with a molecular weight range of 1,000,000 to 23,000,000.

20. The method of claim 18 wherein the coagulant composition is used by adjusting the pH from about 2 to about 10.

21. The method of claim 18 wherein the coagulant composition is used by adjusting pH from about 2 to about 10 and in conjunction with cationic and anionic flocculants, wherein the cationic flocculants are selected from the group consisting of AETAC/Acrylamide copolymers, METAC/Acrylamide copolymers or DADMAC/Acrylamide copolymers in the molecular weight range from 1,000,000 to 14,000,000 and the anionic flocculants are selected from the group consisting of Acrylamide polymers or Acrylic acid/Acrylamide copolymers with a molecular weight range of 1,000,000 to 23,000,000.

22. The method of claim 18 for treating oily wastewater by the addition of the coagulant composition, wherein the coagulant composition is added to the wastewater in an amount from about 1 parts to about 1000 parts per million of wastewater.

23. The method according to claim 18, wherein the reacting step b) comprises reacting a mole ratio of tannin to the polymerized [2-(methacryloyloxy)ethyl]trimethylammonium chloride of about 1:05 to about 1:5 for a period of about 10 to 60 minutes at a temperature of about 35° C. to about 80° C. to produce a homogeneous, viscous brown solution of the polymeric coagulant composition.

24. A coagulant composition for treating oily wastewater produced by a process comprising the steps of
a) polymerizing N,N-(dimethylaminoethyl) methacrylate to a molecular weight of about 500 to about 2,000,000; and
b) reacting the polymerized N,N-(dimethylaminoethyl) methacrylate from a) in an aqueous medium with tannin to form a homogeneous poly(N,N-(dimethylaminoethyl)methacrylate)-tannin coagulant composition.

25. The coagulant composition of claim 24 wherein the tannin is a condensed tannin.

26. The coagulant composition of claim 24 wherein the mole ratio of tannin to the polymerized N,N-(dimethylaminoethyl) methacrylate is about 1:0.5 to about 1:5.

27. The coagulant composition according to claim 24, wherein the reacting step b) comprises reacting a mole ratio of tannin to the polymerized N,N-(dimethylaminoethyl) methacrylate of about 1:05 to about 1:5 for a period of about 10 to 60 minutes at a temperature of about 35° C. to about 80° C. to produce a homogeneous, viscous brown solution of the polymeric coagulant composition.

28. A coagulant composition for treating oily wastewater produced by a process comprising the steps of
a) polymerizing [2-(methacryloyloxy)ethyl]trimethylammonium chloride to a molecular weight of about 500 to about 2,000,000; and
b) reacting the polymerized [2-(methacryloyloxy)ethyl] trimethylammonium chloride from a) in an aqueous medium with tannin to form a homogeneous poly([2-(methacryloyloxy)ethyl] trimethylammonium chloride)-tannin coagulant composition.

29. The coagulant composition of claim 28 wherein the tannin is a condensed tannin.

30. The coagulant composition of claim 28 wherein the mole ratio of tannin to the polymerized [2-(methacryloyloxy)ethyl]trimethylammonium chloride is about 1:0.5 to about 1:5.

31. The coagulant composition according to claim 28, wherein the reacting step b) comprises reacting a mole ratio of tannin to the polymerized [2-(methacryloyloxy)ethyl]trimethylammonium chloride of about 1:05 to about 1:5 for a period of about 10 to 60 minutes at a temperature of about 35° C. to about 80° C. to produce a homogeneous, viscous brown solution of the polymeric coagulant composition.

* * * * *